United States Patent
Nakayama et al.

(10) Patent No.: US 10,298,792 B2
(45) Date of Patent: May 21, 2019

(54) IMAGE READING DEVICE AND IMAGE FORMING APPARATUS INCORPORATING THE IMAGE READING DEVICE

(71) Applicants: Satoshi Nakayama, Kanagawa (JP); Hideyo Makino, Tokyo (JP); Tomoaki Suga, Kanagawa (JP); Yuusuke Kumagawa, Kanagawa (JP)

(72) Inventors: Satoshi Nakayama, Kanagawa (JP); Hideyo Makino, Tokyo (JP); Tomoaki Suga, Kanagawa (JP); Yuusuke Kumagawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/643,938

(22) Filed: Jul. 7, 2017

(65) Prior Publication Data

US 2018/0020108 A1    Jan. 18, 2018

(30) Foreign Application Priority Data

Jul. 12, 2016   (JP) .................................. 2016-137773

(51) Int. Cl.
*H04N 1/00* (2006.01)
*B65H 5/06* (2006.01)
*H04N 1/12* (2006.01)

(52) U.S. Cl.
CPC ......... *H04N 1/00615* (2013.01); *B65H 5/068* (2013.01); *H04N 1/125* (2013.01);
(Continued)

(58) Field of Classification Search
CPC .................................................. H04N 1/00615
(Continued)

(56) References Cited

U.S. PATENT DOCUMENTS

| 2003/0155706 A1* | 8/2003 | Tsutoh ................... B65H 5/062 271/272 |
| 2004/0201162 A1* | 10/2004 | Nishikawa ............. B65H 5/068 271/100 |

(Continued)

FOREIGN PATENT DOCUMENTS

| JP | 2010-114498 | 5/2010 |
| JP | 2011-030174 | 2/2011 |

*Primary Examiner* — Anthony H Nguyen
(74) *Attorney, Agent, or Firm* — Harness, Dickey & Pierce, P.L.C.

(57) ABSTRACT

An image forming device, which is included in an image forming apparatus, includes an image reader, a sheet conveyance passage, a transparent body, an opposing body, and multiple curved opposing portions. The image reader is configured to read an image formed on a target object. The sheet conveyance passage is a passage through which the target object is conveyed. The transparent body is disposed between the sheet conveyance passage and the image reader. The opposing body is disposed facing the transparent body on a side opposite the image reader. The multiple curved opposing portions have respective outwardly curving reference planes. The multiple curved opposing portions are sequentially switched and located at a predetermined image reading position at which the multiple curved opposing portions face the transparent body with a gap through which the target object passes the predetermined image reading position.

14 Claims, 8 Drawing Sheets

(52) U.S. Cl.
CPC ......... *H04N 1/1225* (2013.01); *H04N 1/1235* (2013.01); *B65H 2801/06* (2013.01); *H04N 2201/0094* (2013.01)

(58) Field of Classification Search
USPC .......................................................... 399/361
See application file for complete search history.

(56) References Cited

U.S. PATENT DOCUMENTS

| | | | | |
|---|---|---|---|---|
| 2007/0194520 | A1* | 8/2007 | Kusama | B65H 5/062 |
| | | | | 271/225 |
| 2008/0285097 | A1* | 11/2008 | Kitagawa | H04N 1/0057 |
| | | | | 358/498 |
| 2009/0185238 | A1* | 7/2009 | Wu | H04N 1/00909 |
| | | | | 358/474 |
| 2012/0020713 | A1* | 1/2012 | Ishii | G03G 15/5062 |
| | | | | 399/388 |
| 2013/0293937 | A1* | 11/2013 | Kato | H04N 1/00572 |
| | | | | 358/498 |
| 2016/0130101 | A1* | 5/2016 | Hachisuga | H04N 1/00588 |
| | | | | 358/474 |

* cited by examiner

IMAGE READING DEVICE AND IMAGE FORMING APPARATUS INCORPORATING THE IMAGE READING DEVICE

CROSS-REFERENCE TO RELATED APPLICATION

This patent application is based on and claims priority pursuant to 35 U.S.C. § 119(a) to Japanese Patent Application No. 2016-137773, filed on Jul. 12, 2016, in the Japan Patent Office, the entire disclosure of which is hereby incorporated by reference herein.

BACKGROUND

Technical Field

This disclosure relates to an image reading device and an image forming apparatus incorporating the image reading device.

Related Art

Various types of image reading device include an image reading unit to read an image formed on an object to be conveyed, a transparent member disposed between a conveyance passage through which the object is conveyed, and an opposing member having a reference plane disposed facing a surface of the transparent member opposite to the image reading unit across a predetermined gap.

A known image reading device includes a reference member rotatably disposed as the above-described opposing member. The reference member has a polygonal shape having an octagonal cross section. The reference member includes planar white reference plane and black reference plane, both of which are used as a reference of image reading, on an outer circumferential surface thereof. In the known image reading device, an image reading unit provided thereto can read an image formed on an object by rotating the reference member to switch the white reference plane and the black reference plane, both of which have the different multiple numbers of reference planes.

SUMMARY

At least one aspect of this disclosure provides an image reading device including an image reader, a sheet conveyance passage, a transparent body, an opposing body, and multiple curved opposing portions. The image reader is configured to read an image formed on a target object. The sheet conveyance passage is a passage through which the target object is conveyed. The transparent body is disposed between the sheet conveyance passage and the image reader. The opposing body is disposed facing the transparent body on a side opposite the image reader. The multiple curved opposing portions have respective outwardly curving reference planes. The multiple curved opposing portions are sequentially switched and located at a predetermined image reading position that faces the transparent body with a gap through which the target object passes the predetermined image reading position.

Further, at least one aspect of this disclosure provides an image forming apparatus including an image forming device configured to form an image, a transfer device configured to transfer the image onto a target object, a fixing device configured to fix the image formed on the target object to the target object, and the above-described image reading device.

BRIEF DESCRIPTION OF THE SEVERAL VIEWS OF THE DRAWINGS

An exemplary embodiment of this disclosure will be described in detail based on the following figured, wherein.

DETAILED DESCRIPTION

Figure 1:
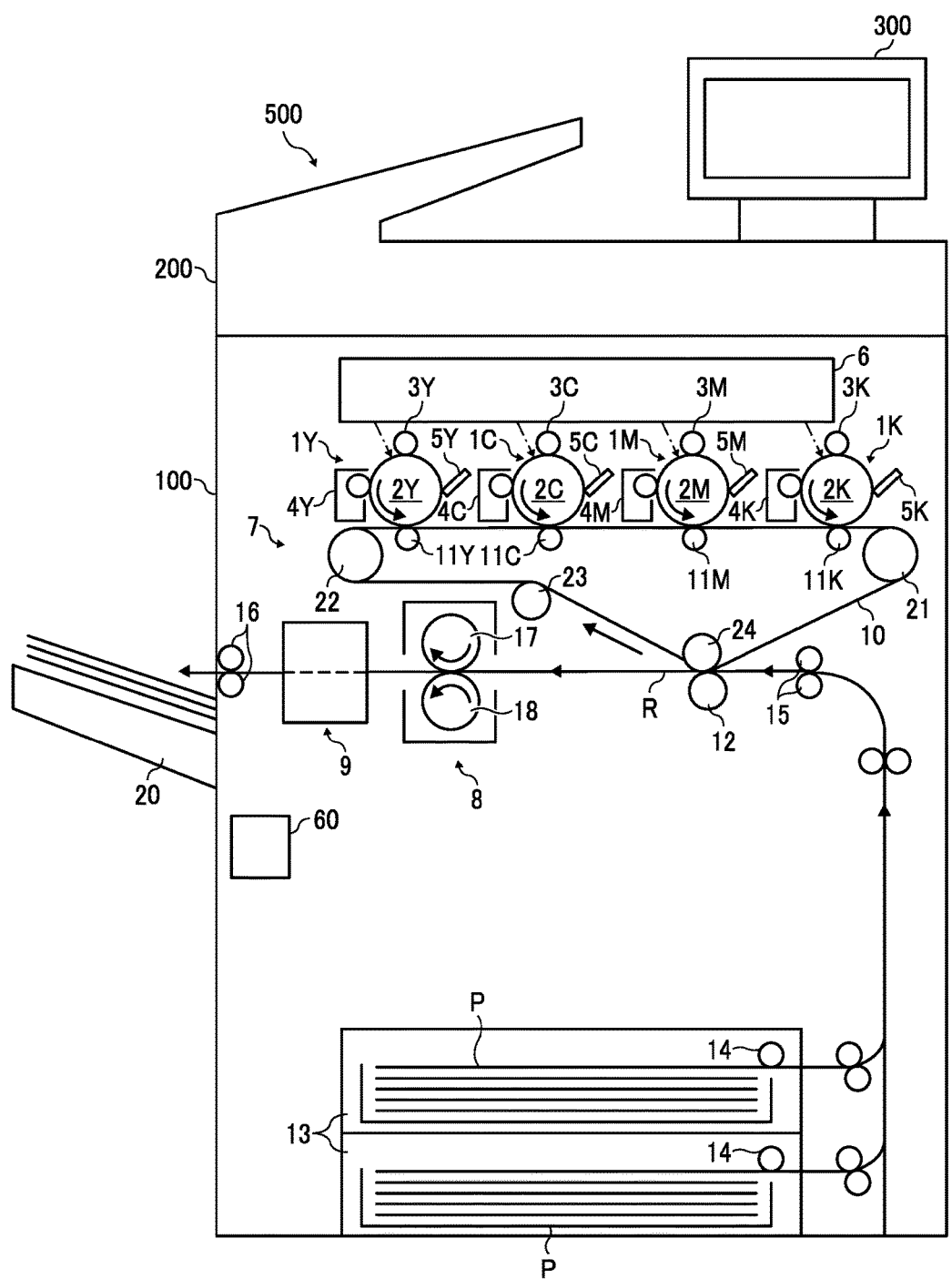
FIG. 1 is a schematic diagram of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of a configuration of an image reading device 9 to read a fixed image on a sheet, included in a color multifunction printer that functions as an electrophotographic image forming apparatus (hereinafter, an image forming apparatus 500), according to an embodiment of this disclosure. It is, however, to be noted that a production printing machine also functions as an electrophotographic image forming apparatus to be applied to this disclosure.

Figure 2:
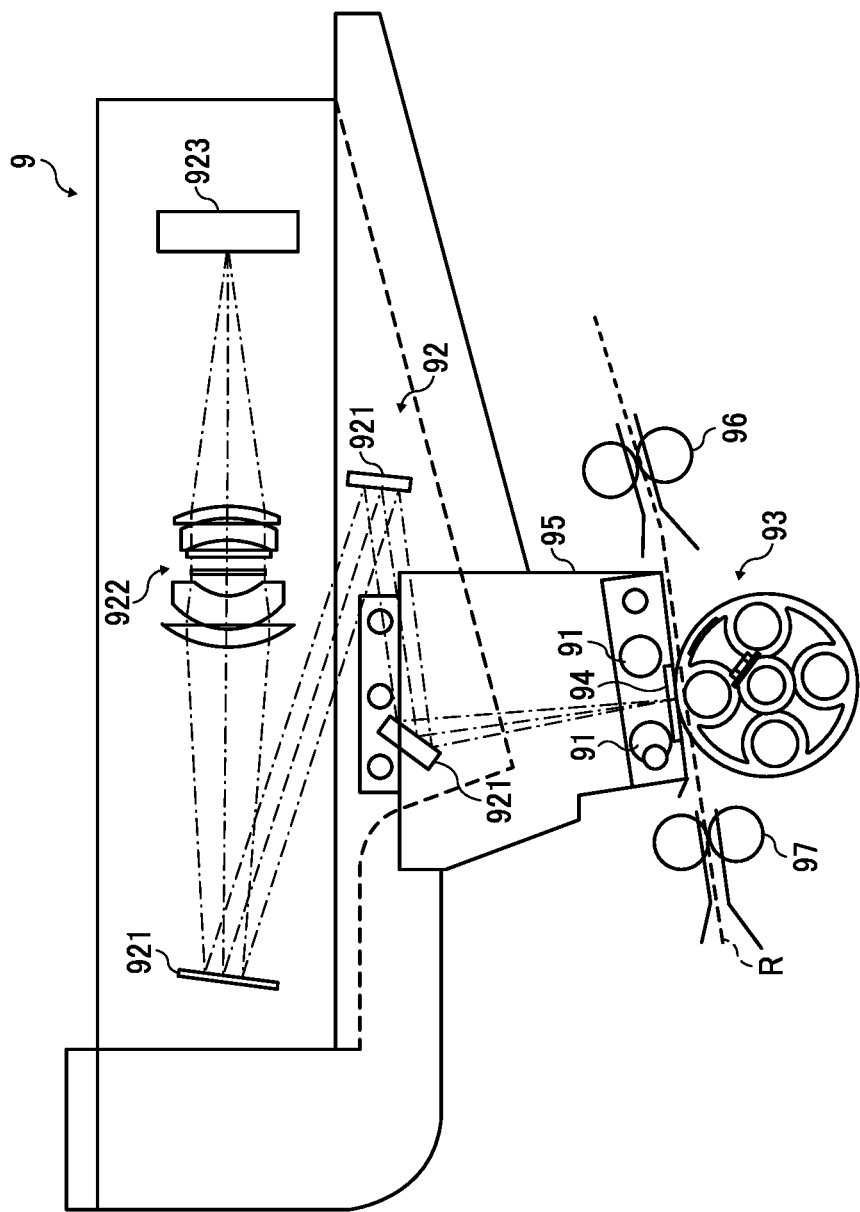
FIG. 2 is a side view illustrating an image reading device included in the image forming apparatus of FIG. 1.

FIG. 1 is a schematic diagram illustrating the image forming apparatus 500 according to the present embodiment of this disclosure. FIG. 2 is a side view illustrating the image reading device 9 included in the image forming apparatus 500 of FIG. 1.

It is to be noted that identical parts are given identical reference numerals and redundant descriptions are summarized or omitted accordingly.

The image forming apparatus 500 may be a copier, a facsimile machine, a printer, a multifunction peripheral or a multifunction printer (MFP) having at least one of copying, printing, scanning, facsimile, and plotter functions, or the like. According to the present example, the image forming apparatus 500 is an electrophotographic multifunction printer that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

At first, a description is given of a basic configuration and functions of the image forming apparatus 500 according to the present embodiment of this disclosure.

As illustrated in FIG. 1, the image forming apparatus 500 includes an apparatus body 100, a scanner 200, and a control display unit 300. The scanner 200 is disposed above the apparatus body 100 to scan and read an image formed on an original document. The control display unit 300 is disposed at an upper part of a rear side of the scanner 200 in a projecting manner.

The scanner 200 includes a first moving unit including an original document lighting source and at least a mirror and a second moving unit including multiple reflection mirrors. Along with reciprocating motions of the first moving unit and the second moving unit, the image formed on the original document that is placed on an exposure glass is read. A scanning light transmitted from the second moving unit is collected by an imaging forming lens to an image forming side of a reading sensor disposed behind the imaging forming lens. Then, the collected light is read by the reading sensor as an image signal.

The control display unit 300 includes a liquid crystal panel with a pressure sensitive touch panel and a speaker. The control display unit 300 is controlled by an apparatus body controller 60 to display an operation screen and a setting screen. When each screen is displayed, selected (input) information is sent to the apparatus body controller 60. In addition, the apparatus body controller 60 causes the control display unit 300 to inform users of operation status of each unit of the image forming apparatus 500, messages to users such as sheet supply, toner supply, and warning, and any other information visually on the liquid crystal panel or audibly by sound from the speaker.

As illustrated in FIG. 1, the apparatus body 100 of the image forming apparatus 500 includes four process units 1Y, 1C, 1M, and 1K. The four process units 1Y, 1C, 1M, and 1K are image forming units of a tandem-type image forming device aligned in tandem. Suffixes, which are Y, C, M, and K, are used to indicate respective colors of toners (e.g., yellow, cyan, magenta, and black toners) for the process units 1Y, 1C, 1M, and 1K. The process units 1Y, 1C, 1M, and 1K have substantially the same configuration except for containing different color toners of yellow (Y), cyan (C), magenta (M), and black (K) corresponding to color separation components of a color image. The process units 1Y, 1C, 1M, and 1K are detachably attachable to the apparatus body 100 of the image forming apparatus 500.

To be more specific, each of the process units 1Y, 1C, 1M, and 1K includes a drum-shaped photoconductor 2 (i.e., drum-shaped photoconductors 2Y, 2C, 2M, and 2K) that functions as an image bearer, a charging roller 3 (i.e., charging rollers 3Y, 3C, 3M, and 3K) that functions as a charging unit to charge a surface of the photoconductor 2, a developing device 4 (i.e., developing devices 4Y, 4C, 4M, and 4K) that functions as a developing unit to form a toner image on the surface of the photoconductor 2, a cleaning blade 5 (i.e., cleaning blades 5Y, 5C, 5M, and 5K) that functions as a cleaning unit to clean the surface of the photoconductor 2.

In FIG. 1, an exposure device 6 is disposed above the process units 1Y, 1C, 1M, and 1K to irradiate respective surfaces of the photoconductors 2Y, 2C, 2M, and 2K. The exposure device 6 includes a light source, a polygon mirror, f-theta (theta) lenses, and reflection mirrors to emit a laser light beam onto the surface of each of the photoconductors 2Y, 2C, 2M, and 2K based on image data inputted via an external device such as a personal computer and the scanner 200.

Further, a transfer device 7 is disposed below the process units 1Y, 1C, 1M, and 1K. The transfer device 7 includes an intermediate transfer belt 10 including an endless belt that functions as a transfer body. The intermediate transfer belt 10 is stretched over multiple tension rollers 21, 22, 23, and 24. One of the multiple tension rollers 21, 22, 23, and 24 functions as a drive roller to rotate the intermediate transfer belt 10. The intermediate transfer belt 10 goes around and travels (is rotated) in a direction illustrated by arrow in FIG. 1.

Four primary transfer rollers 11Y, 11C, 11M, and 11K functioning as primary transfer units are disposed at respective positions at which the primary transfer rollers 11Y, 11C, 11M, and 11K face the photoconductors 2Y, 2C, 2M, and 2K, respectively. At the respective positions, the primary transfer rollers 11Y, 11C, 11M, and 11K are pressed against an inner circumferential surface of the intermediate transfer belt 10. Thus, primary transfer nip regions are formed at positions at which the photoconductors 2Y, 2C, 2M, and 2K contact respective pressed portions of the intermediate transfer belt 10. Each of the primary transfer rollers 11Y, 11C, 11M, and 11K is connected to a power source, and a predetermined direct current (DC) voltage and/or a predetermined alternating current (AC) voltage are supplied to the primary transfer rollers 11Y, 11C, 11M, and 11K.

A secondary transfer roller 12 that functions as a secondary transfer unit is disposed at a position at which the secondary transfer roller 12 faces the tension roller 24 that is one of the multiple tension rollers (i.e., the multiple tension rollers 21, 22, 23, and 24) over which the intermediate transfer belt 10 is stretched. The secondary transfer roller 12 is pressed against an outer circumferential surface of the intermediate transfer belt 10. Thus, a secondary transfer nip region is formed at a position at which the secondary transfer roller 12 and the intermediate transfer belt 10 contact each other. Similar to the primary transfer rollers 11Y, 11C, 11M, and 11K, the secondary transfer roller 12 is connected to a power source, and a predetermined direct current (DC) voltage and/or a predetermined alternating current (AC) voltage are supplied to the secondary transfer roller 12.

Multiple sheet trays 13 are disposed below the apparatus body 100 to accommodate sheet-type recording medium P or recording media P, such as sheets of paper or overhead projector (OHP) sheets. Each of the multiple sheet trays 13 is provided with a sheet feed roller 14 to feed the recording media P stored therein.

A sheet output tray 20 that functions as a sheet output unit is mounted on an outer circumferential surface of the apparatus body 100 of the image forming apparatus 500 at the left side in FIG. 1. The sheet output tray 20 stacks the recording medium P or the recording media P discharged to an outside of the apparatus body 100.

A sheet conveyance passage R is defined to transport a recording medium P from a selected one of the multiple sheet trays 13 to the sheet output tray 20 through the secondary transfer nip region. In the sheet conveyance passage R, a pair of registration rollers 15 is disposed upstream from the secondary transfer roller 12 in a conveying direction of a recording medium P (hereinafter, referred to as a "sheet conveying direction").

A fixing device 8, an image reading device 9, and a pair of output rollers 16 are sequentially disposed downstream from the secondary transfer roller 12 in the sheet conveying direction. The fixing device 8 includes a fixing roller 17 and a pressure roller 18. The fixing roller 17 functions as a fixing member including an internal heater. The pressure roller 18 functions as a pressing member to press the fixing roller 17.

A fixing nip region is formed at a position at which the fixing roller 17 and the pressure roller 18 contact to each other.

It is to be noted that the apparatus body controller 60 includes a central processing unit (CPU), a random access memory (RAM), a read-only memory (ROM), a non-volatile memory, and various drivers. Programs stored in the ROM and the non-volatile memory are loaded to the RAM, where the CPU calculates based on input data of information from an external device, detection results obtained by various sensors, and the control display unit 300. Then, the apparatus body controller 60 communicates with various devices and various device controllers to control the operations performed in the image forming apparatus 500.

Next, a description is given of a basic operation of the image forming apparatus 500. It is to be noted that the components and units having the identical configuration or structure except for toner color are occasionally described without suffixes. For example, the photoconductors 2Y, 2C, 2M, and 2K are hereinafter also referred to in a singular form as the photoconductor 2.

After an original document is placed on an exposure glass of the scanner 200, as a user presses a copy button (a start button) on the control display unit 300, the scanner 200 starts reading the original document. Simultaneously, in the process units 1Y, 1C, 1M, and 1K, the photoconductor 2 is rotated in a counterclockwise direction in FIG. 1. Then, the charging roller 3 uniformly charges a surface of the photoconductor drum 102 to a predetermined polarity.

Based on image data of the original document read by the scanner 200, the exposure device 6 emits laser light onto the charged surface of each photoconductors 2 to irradiate the surface of the photoconductor 2 so as to form an electrostatic latent image on the surface of the photoconductor 2. At this time, image data exposed to the photoconductor 2 is single-color image information obtained by separating a desired full-color image into single-color information on yellow, cyan, magenta, and black. The developing device 4 (i.e., the developing devices 4Y, 4C, 4M, and 4K) supplies toner onto the electrostatic latent image formed on the photoconductor 2, thus developing (visualizing) each of the electrostatic latent images into a visible image as a toner image.

One of the multiple tension rollers (i.e., the multiple tension rollers 21, 22, 23, and 24) over which the intermediate transfer belt 10 is stretched is driven for rotation to circulate the intermediate transfer belt 10 in a direction indicated by arrow in FIG. 1. The power supply applies a constant voltage or a constant current control voltage having a polarity opposite the polarity of the toner to the primary transfer roller 11 (i.e., the primary transfer rollers 11Y, 11C, 11M, and 11K), creating a transfer electric field at each primary transfer nip region formed between the photoconductor 2 and the primary transfer roller 11. And, toner images of respective colors on the photoconductors 2 (i.e., the photoconductors 2Y, 2C, 2M, and 2K) are transferred one on another onto the intermediate transfer belt 10 by the transfer electric fields formed at the primary nip regions. Thus, the intermediate transfer belt 10 bears a full-color toner image on the surface thereof.

Further, residual toner remaining on the photoconductor 2 without being transferred onto the intermediate transfer belt 10 is removed by the cleaning blade 5.

With rotation of the sheet feed roller 14, the recording medium P is fed from a selected one of the sheet trays 13. The recording medium P fed from the selected sheet tray 13 is further conveyed to the secondary transfer nip region between the secondary transfer roller 12 and the intermediate transfer belt 10 at a predetermined timing measured by the pair of registration rollers 15 so as to synchronize with movement of the full-color toner image on the intermediate transfer belt 10. At this time, a transfer voltage of the polarity opposite the charged polarity of toner of the toner image on the intermediate transfer belt 10 is supplied to the secondary transfer roller 12. As a result, a transfer electric field is formed at the secondary transfer nip region. By the transfer electric field formed at the secondary transfer nip region, the toner image on the intermediate transfer belt 10 is collectively transferred onto the recording medium P.

Then, the recording medium P is sent into the fixing device 8, and the fixing roller 17 and the pressure roller 18 apply heat and pressure to fix the toner image on the recording medium P. After the recording medium P formed by the image reading device 9, the pair of output rollers 16 outputs the recording medium P onto the sheet output tray 20.

It is to be noted that residual toner remaining on the recording medium P in the secondary transfer nip region is removed by a belt cleaning device that is disposed facing the tension roller 22 via the intermediate transfer belt 10. By so doing, the image forming apparatus 500 is brought to be ready to perform a sequential image forming operation (a print job).

The above description relates to the basic image forming operation performed by the image forming apparatus 500 for forming a full color image on a recording medium P. In addition to the above-described image forming operation, the image forming apparatus 500 can form a single color image by any one of the process units 1Y, 1C, 1M, and 1K, or form a composite color image of two or three colors by two or three of the process units 1Y, 1C, 1M, and 1K.

Embodiment 1

Now, a description is given of the image reading device 9 of the image forming apparatus 500.

Figure 3A:
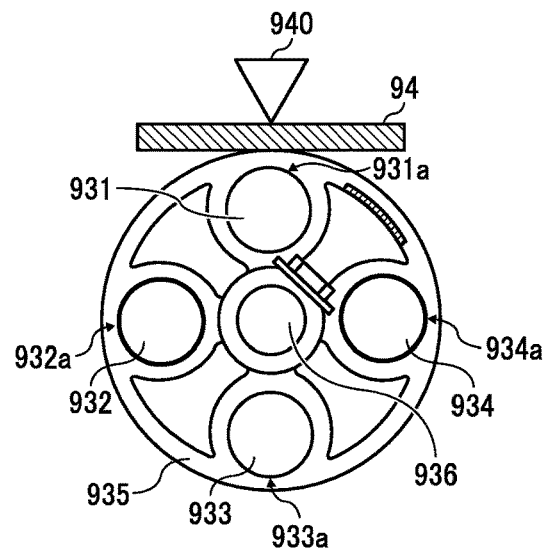
FIG. 3A is an enlarged view illustrating an opposing member included in the image reading device according to Embodiment 1.
Figure 3B:
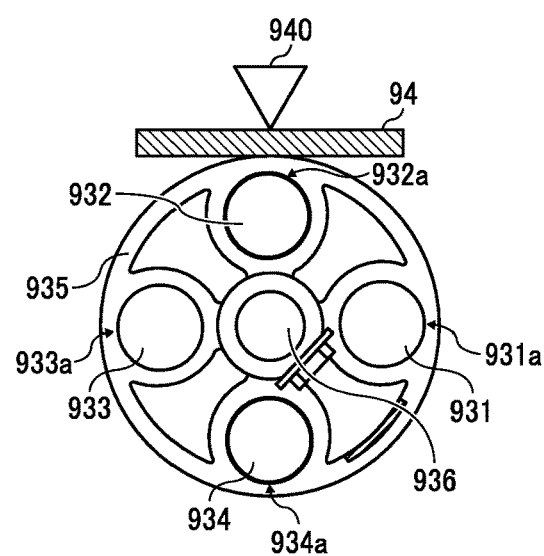
FIG. 3B is a diagram illustrating a roller bracket rotated by 90 degrees in a clockwise direction from the state illustrated in FIG. 3A.

FIG. 2 is a side view illustrating the image reading device 9 included in the image forming apparatus 500 of FIG. 1. FIG. 3A is an enlarged view illustrating an opposing member 93 included in the image reading device 9 according to Embodiment 1. FIG. 3B is a diagram illustrating a roller bracket 935 rotated by 90 degrees in a clockwise direction from the state illustrated in FIG. 3A.

As illustrated in FIG. 1, the image reading device 9 is disposed downstream from the fixing device 8 in the sheet conveying direction. The image reading device 9 optically reads an image formed on the recording medium P and generates image data that corresponds to a target image to be used for image correction. Based on the image data generated by the image reading device 9, the image forming apparatus 500 performs image correction of the image to form on the recording medium P. Therefore, it is preferable to vary the color of the opposed member 93 according to the image correction and a gap formed between the opposing member 93 that functions as an opposing body and an exposure glass 94 that functions as a transparent body.

As illustrated in FIG. 2, the image reading device 9 includes illumination light sources 91, an image reading unit 92, the opposing member 93, the exposure glass 94, and a support 95.

The illumination light sources 91 are disposed at the same side of an image forming side, on which an image is formed, of the recording medium P. When the recording medium P is conveyed, the illumination light sources 91 face the image forming side of the recording medium P. Consequently, the illumination light sources 91 irradiate an image reading position in the sheet conveyance passage R. When the recording medium P passes the image reading device 9, an image formed on the recording medium P is read at the image reading position in the sheet conveyance passage R.

The image reading unit 92 that functions as an image reader includes three reflection mirrors 921, an image forming lens 922, and an image sensor unit 923.

The three reflection mirrors 921 guides reflection light reflected on the image forming side of the recording medium P when the recording medium P passes the image reading position, from the image reading position to the image forming lens 922.

The image forming lens 922 leads the reflection light reflected on the image forming side of the recording medium P guided by the three reflection mirrors 921 to the image sensor unit 923 so as to form an image.

The image sensor unit 923 includes at least one image sensor to read the image formed on the image forming side of the recording medium P.

Further, the opposing member 93 includes four rollers 931, 932, 933, and 934 having respective outer circumferential surfaces 931a, 932a, 933a, and 934a, and reference plane members 991, 992, and 993. When no recording medium P comes at the image reading position, the image sensor unit 923 reads the outer circumferential surfaces 931a, 932a, 933a, and 934a of the rollers 931, 932, 933, and 934 or the reference plane members 991, 992, and 993. The outer circumferential surfaces 931a, 932a, 933a, and 934a and the reference plane members 991, 992, and 993 function as curved opposing portions. Consequently, the image sensor unit 923 receives light of the image formed by the image forming lens 922, and generates image data according to the amount of received light.

The opposing member 93 is disposed at the opposed side (the back side) of the image forming surface of the recording medium P. That is, when the recording medium P is conveyed, the opposing member 93 face the opposed side of the image forming side of the recording medium P. As illustrated in FIGS. 3A and 3B, the opposing member 93 further includes a roller bracket 935 that functions as a rotary body holder. The four rollers 931, 932, 933, and 934 that function as rotary bodies are rotatably held by the roller bracket 935. The four rollers 931, 932, 933, and 934 are rotary bodies including the respective outer circumferential surfaces 931a, 932a, 933a, and 934a that function as curved opposing portions, each having a reference plane projecting or outwardly curving to form a projection. The four rollers 931, 932, 933, and 934 rotate separately from the roller bracket 935. Further, the roller bracket 935 is fixedly mounted on a roller bracket shaft 936. As the roller bracket shaft 936 rotates, the roller bracket 935 is rotated with the roller bracket shaft 936 while holding the four rollers 931, 932, 933, and 934. Accordingly, the respective outer circumferential surfaces 931a, 932a, 933a, and 934a of the four rollers 931, 932, 933, and 934 are selectively switched and brought to a predetermined image reading position arranged to face the exposure glass 94 in the gap through which the recording medium P can pass the predetermined image reading position.

It is to be noted that the image reading position is set, for example, to the closest facing position of the outer circumferential surfaces 931a, 932a, 933a, and 934a of the four rollers 931, 932, 933, and 934 to the exposure glass 94. It is to be noted that the image reading position may be set to a position close to the exposure glass 94 by the thickness of the recording medium P from the closest facing position of the outer circumferential surfaces 931a, 932a, 933a, and 934a selectively facing the exposure glass 94, to the exposure glass 94.

The exposure glass 94 is a light transmitting member disposed at the image reading position having the opposed side of the image reading side of the recording medium P conveyed.

The support 95 is a member on which the illumination light sources 91 and the image reading unit 92 are fixedly mounted. The sheet conveyance passage R includes a partial passage separately defined from an upstream part and a downstream part therein. The partial passage of the sheet conveyance passage R is defined and supported by the support 95. A sheet conveying roller 96 that functions as a conveying body is disposed in the upstream part defined upstream from the partial passage of the sheet conveyance passage R in the sheet conveying direction, and a sheet conveying roller 97 that functions as a conveying body is disposed in the downstream part defined downstream from the partial passage of the sheet conveyance passage R in the sheet conveying direction.

When the recording medium P passes in a state illustrated in FIG. 3A, the image reading unit 92 reads the image forming side of the recording medium P via the exposure glass 94 from a direction indicated by arrow 940 in the drawing. When the outer circumferential surface 931a of the roller 931 is located at a position to face the exposure glass 94, as the recording medium P passes through the partial passage of the sheet conveyance passage R, the roller 931 is rotated along with the movement of the recording medium P. By so doing, the recording medium P is conveyed in the sheet conveyance passage R. As described above, the roller 931 that functions as a rotary body of the opposing member 93 conveys the recording medium P. Therefore, even if a relatively narrow gap is provided so that the recording medium P does not flutter or rattle, a paper jam is not likely to occur.

The four rollers 931, 932, 933, and 934 are different from each other in at least one of color and diameter. For example, the roller 931 is a black roller having a regular diameter, the roller 932 is a white roller having a smaller diameter, the roller 933 is a white roller having a regular diameter, and the roller 934 is a black roller having a small diameter. The colors of the four rollers 931, 932, 933, and 934 are changed in a sheet passage mode of the recording medium P. The diameters of the four rollers 931, 932, 933, and 934 may be changed depending on the thickness of the recording medium P or changed when the shading operation is performed.

As illustrated in FIG. 3B, the outer circumferential surface 932a of the roller 932 is located at the position to face the exposure glass 94, that is, immediately below the exposure glass 94. The roller 932 has the diameter smaller than the diameter of the roller 931 and functions as a shading roller. The width of the gap from the closest portion of the outer circumferential surface 932a of the roller 932 to the exposure glass 94 becomes greater than the width of the gap from the closest portion of the outer circumferential surface 931a of the roller 931 to the exposure glass 94 explained with FIG. 3A. Accordingly, the width of the gap can be controlled based on the thickness of the recording medium P.

The four rollers 931, 932, 933, and 934 may be driven by a drive unit. With this configuration, even when the gap between the exposure glass 94 and any one roller of the four rollers 931, 932, 933, and 934 disposed facing the exposure glass 94 becomes narrower or smaller, the recording medium P can be conveyed. It is to be noted that the four rollers 931, 932, 933, and 934 may be driven by respective drive units.

Figure 4A:
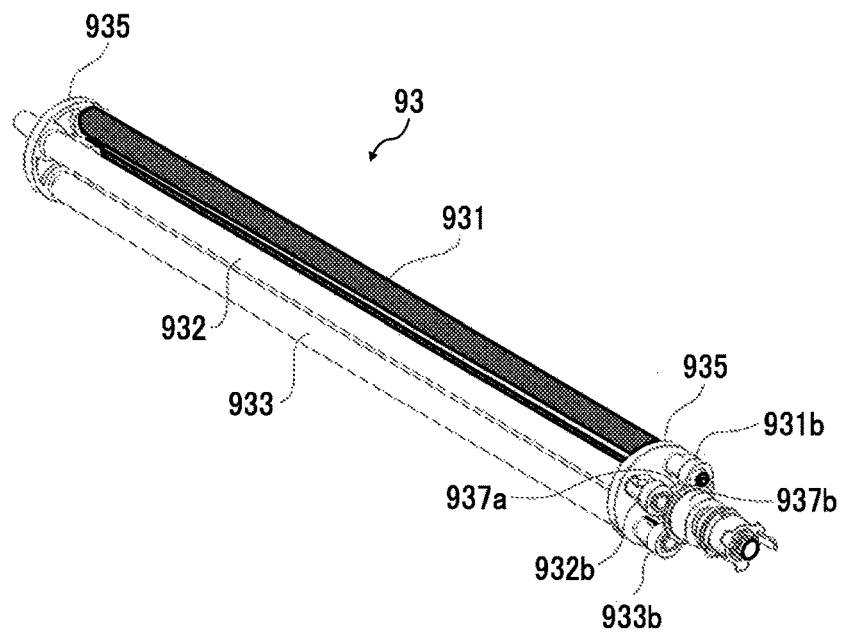
FIG. 4A is a perspective view illustrating the opposing member according to Embodiment 1.
Figure 4B:
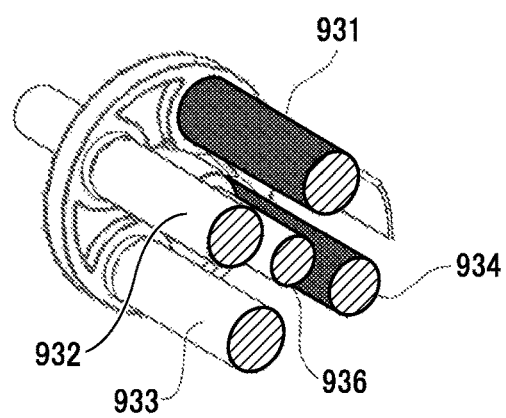
FIG. 4B is an enlarged view illustrating a perspective cross section of the opposing member of FIG. 4A.

FIG. 4A is a perspective view illustrating the opposing member 93 that rotates the four rollers 931, 932, 933, and 934, according to Embodiment 1. FIG. 4B is an enlarged view illustrating a perspective cross section of the opposing member 93 of FIG. 4A.

Figure 8:
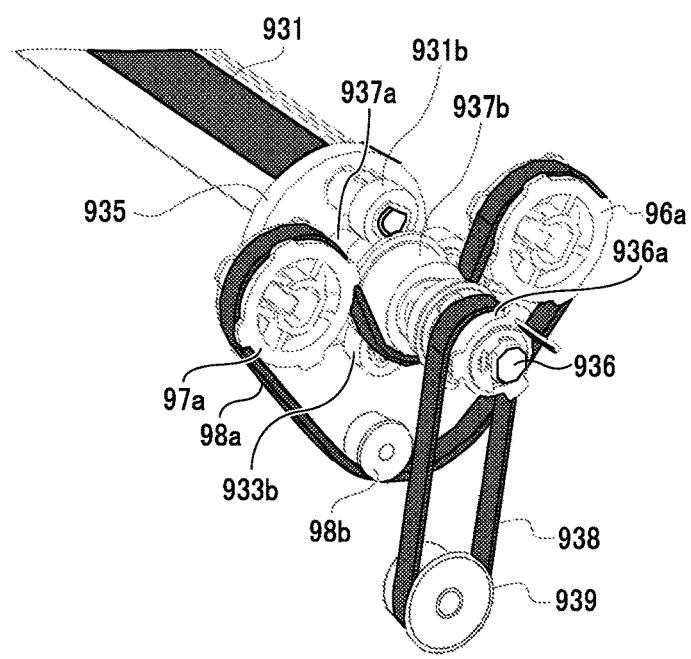
FIG. 8 is a perspective view illustrating a drive unit of the opposing member according to Embodiment 3.

The four rollers 931, 932, 933, and 934 include roller gears 931b, 932b, 933b, and 934b, respectively. The roller bracket 935 rotates coaxially with a roller drive gear 937a that function as a rotary body driving body. The roller gears 931b, 932b, 933b, and 934b are drivingly coupled with the roller drive gear 937a. According to this configuration, as the roller drive gear 937a rotates, the four rollers 931, 932, 933, and 934 are rotated via the roller gears 931b, 932b, 933b, and 934b, respectively. A roller drive pulley 937b that function as a rotary body driving body is attached to the roller drive gear 937a as a single unit. The sheet conveying roller 96 that is disposed upstream from the image reading position in the sheet conveying direction includes a sheet conveying roller drive pulley 96a and the sheet conveying roller 97 that is disposed downstream from the image reading position in the sheet conveying direction includes a sheet conveying roller drive pulley 97a. The roller drive pulley 937b is drivingly coupled with the sheet conveying roller drive pulleys 96a and 97a and a drive belt 98a, as illustrated in FIG. 8. This drive unit functions as a rotation drive unit to drive and rotate the four rollers 931, 932, 933, and 934.

Consequently, as the drive pulley 98b is rotated by a drive source, the sheet conveying roller drive pulleys 96a and 97a and the roller drive pulley 937b are simultaneously rotated via the drive belt 98a. According to this configuration, when the sheet conveying rollers 96 and 97 are rotated, the four rollers 931, 932, 933, and 934 are rotated via the roller drive gear 937a and the roller gears 931b, 932b, 933b, and 934b at the same time. At this time, the roller 931 that is disposed facing the exposure glass 94 moves in the same direction as the moving direction of the recording medium P, as illustrated in FIG. 5.

Embodiment 2

Figure 5:
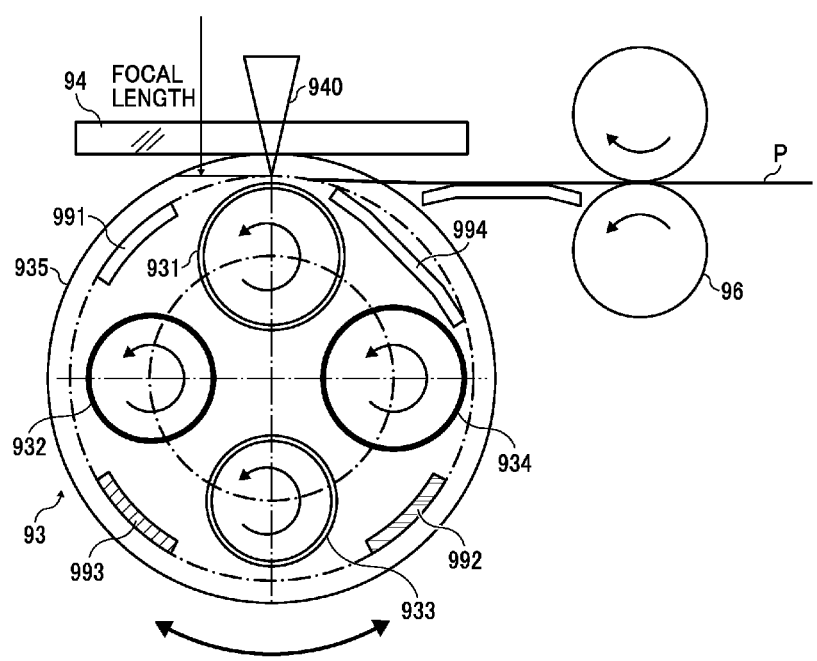
FIG. 5 is an enlarged side view illustrating an opposing member according to Embodiment 2.

FIG. 5 is an enlarged side view illustrating the opposing member 93 according to Embodiment 2.

As illustrated in FIG. 5, the opposing member 93 includes the four rollers 931, 932, 933, and 934, the three reference plane members 991, 992, and 993, and a guide 994. The four rollers 931, 932, 933, and 934 function as rotary bodies. The three reference plane members 991, 992, and 993 function as curved opposing portions having respective reference planes. The four rollers 931, 932, 933, and 934 rotate so as not to hinder conveyance of the recording medium P when the recording medium P is conveyed to cause an image formed on the recording medium P to be read at a position of the image reading unit 92 with a proper focal length. The four rollers 931, 932, 933, and 934 are rotatably held by the roller bracket 935. The three reference plane members 991, 992, and 993 and the guide 994 are fixedly held by the roller bracket 935. By rotating the roller bracket 935 of the opposing member 93, the four rollers 931, 932, 933, and 934, the three reference plane members 991, 992, and 993, and the guide 994 are rotated as a single unit. Accordingly, the opposing member 93 can selectively switch the positions of the four rollers 931, 932, 933, and 934, the three reference plane members 991, 992, and 993, and the guide 994 at the predetermined image reading position at which the image reading unit 92 reads the image formed on the recording medium P.

In order to restrain fluttering of the recording medium P and perform an image reading operation at an appropriate focal length to match the focal length of the optical components of the image reading unit 92, a distance from the exposure glass 94 to a position of an appropriate focal length (i.e., the image reading position) is reduced to decrease the width of the gap through which the recording medium P passes. Consequently, in the image reading operation in which an image formed on the recording medium P is read, at least a roller disposed at the image reading position, of the four rollers 931, 932, 933, and 934 is driven to rotate so that the recording medium P can pass through the narrow gap reliably.

In the configuration illustrated in FIG. 5, the appropriate focal length of the image reading unit 92 is set to the front surface of the recording medium P when the recording medium P contacts the roller 931 (see an outer or larger broken line in the drawing), so as to make the gap between the exposure glass 94 and the roller 931 smaller. When the image reading operation in which an image formed on the recording medium P is read while the recording medium P is passing through the gap, the roller 931 is rotated in the same direction as the moving direction of the recording medium P. Consequently, the width of the gap between the exposure glass 94 and the roller 931 is reduced, and fluttering of the recording medium P caused by conveyance of the recording medium P is restrained. At the same time, the roller 931 rotates while contacting the recording medium P during conveyance, and therefore the recording medium P can be conveyed reliably without causing any paper jam.

By contrast, at timing before the image reading operation or between consecutive conveyances of the recording media P, the opposing member 93 is rotated to cause one of the three reference plane members 991, 992, and 993 to come to the image reading position. The image reading unit 92 reads the one of the three reference plane members 991, 992, and 993. By so doing, the image correction is performed. At this time, respective positions of the outer surfaces of the reference plane members 991, 992, and 993 are disposed to match the appropriate focal length (i.e., the image reading position) (see the outer or larger broken line in FIG. 5). During the time period of the image correction, conveyance of the recording medium P is not performed so as to prohibit entrance of the recording medium P to the image reading position.

The three reference plane members 991, 992, and 993 are fixed members that do not rotate, and have a shape to be disposed in a space between adjacent two rollers of the four rollers 931, 932, 933, and 934. For example, as illustrated in FIG. 5, the reference plane member 991 is disposed between the rollers 931 and 932, the reference plane member 992 is disposed between the rollers 933 and 934, and the reference plane member 993 is disposed between the rollers 932 and 933.

Further, the reference plane members 991, 992, and 993 have a curved shape to rotate about the rotation center of a rotation switching device to rotate the opposing member 93. Due to the curved shape of the reference plane members 991, 992, and 993, even when a stop angle error occurs to the rotation switching device, the position and inclination of each reference plane of the reference plane members 991, 992, and 993 do not change. Specifically, each of the reference plane members 991, 992, and 993 has an outer side circular arc having a curved shape (see the outer or larger broken line in FIG. 5). In other words, the outer side circular arc of the reference plane members 991, 992, and 993 has a curved shape and has a radius of curvature equal to a distance between the center of rotation of the roller bracket 935 and the image reading position. According to this configuration, the roller bracket 935 is rotated to locate the reference plane members 991, 992, and 993 at the image reading position, and then can stop without high stopping accuracy. Further, since the reference plane members 991, 992, and 993 have predetermined spaces to be located, space saving of the image reading device 9 can be achieved, and therefore the image reading device 9 can be reduced in size.

It is to be noted that, in a non-image reading operation in which an image formed on the recording medium P is not read while the recording medium P is conveyed, the recording medium P is not maintained to be at an appropriate focus position with the appropriate focal length. Therefore, the guide 994 that functions as a guide member is disposed on an opposite side of the image reading position such that the gap has a length to convey the recording medium P without a conveying force of a roller at the image reading position. With this configuration, the recording medium P is conveyed. During the non-image reading operation, the four rollers 931, 932, 933, and 934 do not rotate, that is, remain stopped. Since the four rollers 931, 932, 933, and 934 are stopped, energy saving of the image reading device 9 can be achieved in the non-image reading operation.

It is to be noted that the apparatus body controller 60 that functions as a controller controls a driving and rotating position of the roller bracket 935 such that the four rollers 931, 932, 933, and 934, the reference plane members 991, 992, and 993, and the guide 994 are selectively switched to be located at the image reading position.

Figure 6A:
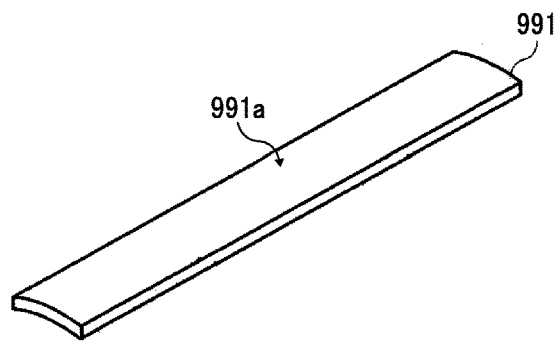
FIGS. 6A, 6B, and 6C are perspective views illustrating examples of reference plane members according to Embodiment 2.
Figure 6B:
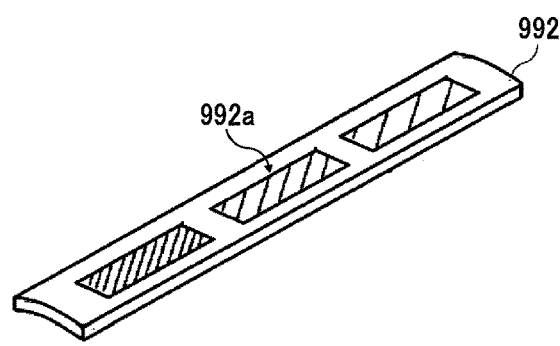
Figure 6C:
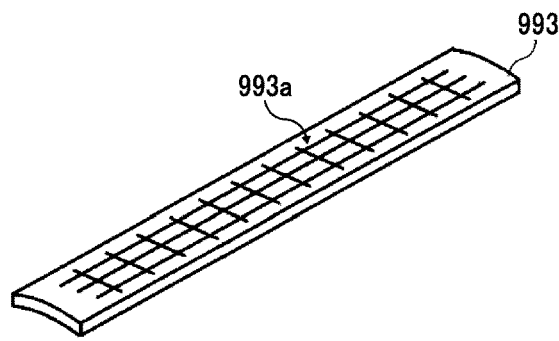
Figure 6D:
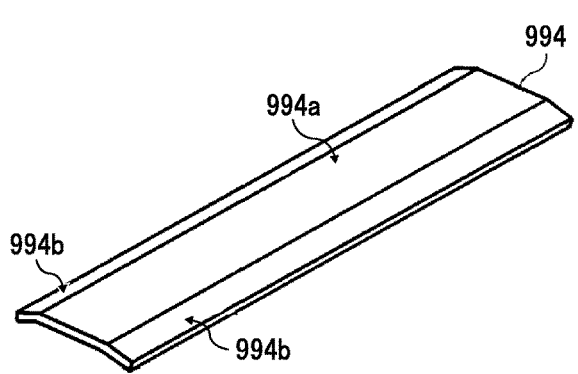
FIG. 6D is a perspective view illustrating an example of a guide member according to Embodiment 2.

FIGS. 6A, 6B, and 6C are perspective views illustrating examples of the reference plane members 991, 992, and 993 according to Embodiment 2. FIG. 6D is a perspective view illustrating an example of the guide 994 according to Embodiment 2.

The reference plane member 991 illustrated in FIG. 6A includes a white reference plane 991a that functions as a reference plane having a uniform white density. When the shading correction is performed in the image reading device 9, the reference plane member 991 is located at the image reading position. It is to be noted that the reference plane member 991 may include a black reference plane that functions as a reference plane having a uniform black density. In this case, when the image formed on the recording medium P is read in the image reading device 9, the reference plane member 991 having the black reference plane may be located at the image reading position.

The reference plane member 992 illustrated in FIG. 6B includes a reference color patch image 992a that functions as a reference plane. When color output correction is performed in the image reading device 9, the reference plane member 992 is located at the image reading position.

The reference plane member 993 illustrated in FIG. 6C includes a line image 993a that functions as a reference plane having lines drawn at predetermined positions at known intervals. When position correction of the magnification and registration of the image formed on the recording medium P in the image reading device 9, the reference plane member 993 is located at the image reading position.

The guide 994 illustrated in FIG. 6D includes a plate member including a flat face 994a and curved faces 994b. When the non-image reading operation is performed, the guide 994 is located at the image reading position for conveyance of the recording medium P. In order the recording medium P to pass easily, the guide 994 is disposed facing the exposure glass 94 with a gap wider or greater than the reference plane members 991, 992, and 993. With this configuration, the recording medium P can be guided by the flat face 994a of the guide 994. Accordingly, the conveying force applied to the recording medium P is reduced, and, at the same time, the recording medium P can be conveyed reliably.

Embodiment 3

The four rollers 931, 932, 933, and 934 of the opposing member 93 may be driven and rotated by a drive source disposed upstream or downstream from the image reading position in the sheet conveying direction.

Figure 7:
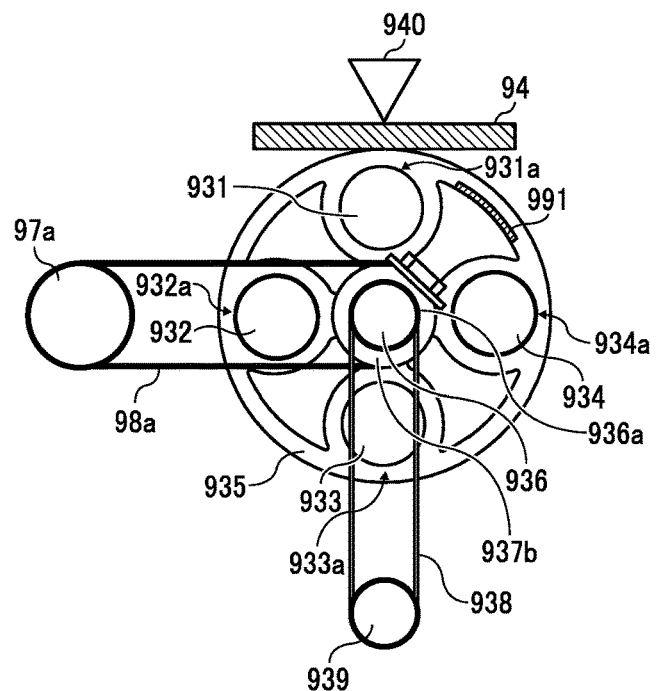
FIG. 7 is a side view illustrating an opposing member according to Embodiment 3.

FIG. 7 is a side view illustrating a drive unit of the opposing members 93 according to Embodiment 3.

The drive unit of the opposing member 93 illustrated in FIG. 7 employs a drive source of the sheet conveying roller 97 disposed downstream from the image reading position in the sheet conveying direction so as to rotate the outer circumferential surfaces 931a, 932a, 933a, and 934a of the four rollers 931, 932, 933, and 934. The roller bracket 935 is rotated by a drive source different from the drive source to drive and rotate the sheet conveying roller 97.

As illustrated in FIG. 7, the roller bracket 935 that is disposed facing the exposure glass 94 is fixedly mounted on the roller bracket shaft 936. As the roller bracket shaft 936 rotates, the roller bracket 935 is rotated with the rotation of the roller bracket shaft 936. The roller bracket 935 can rotatably hold the four rollers 931, 932, 933, and 934 separately from the roller bracket 935. That is, the roller bracket 935 does not rotate together with rotations of the four rollers 931, 932, 933, and 934. Further, the roller bracket 935 holds the reference plane member 991 between the rollers 931 and 934 in Embodiment 3. Further, the four rollers 931, 932, 933, and 934 are drivingly coupled with the roller drive gear 937a that coaxially rotates with the roller bracket 935. As the roller drive gear 937a rotates, the four rollers 931, 932, 933, and 934 are rotated with the rotation of the roller drive gear 937a. The roller drive gear 937a also coaxially rotates with the roller bracket shaft 936. The roller drive gear 937a is rotatably mounted on the roller bracket shaft 936 via a bearing. The drive pulley 98b that is provided with the roller drive gear 937a as a single unit is connected to the sheet conveying roller drive pulley 97a of the sheet conveying roller 97 disposed downstream from the image reading position in the sheet conveying direction via the drive belt 98a. As the drive source such as a drive motor drives and rotates the sheet conveying roller 97, the four rollers 931, 932, 933, and 934 are rotated in the same direction as the rotation of the sheet conveying roller 97. Consequently, the four rollers 931, 932, 933, and 934 can share the drive source with the sheet conveying roller 97 without providing a different drive source or different drive sources dedicated to the four rollers 931, 932, 933, and 934 and, at the same time, the recording medium P can be conveyed reliably.

Further, a roller bracket shaft drive pulley 936a is disposed at the leading end of the roller bracket shaft 936 and is coupled a roller bracket drive pulley 939 via a drive belt 938. Both the roller bracket drive pulley 939 and the drive belt 938 function as a drive device. As a drive source such as a drive motor drives and rotates the roller bracket drive pulley 939, the roller bracket shaft 936 and the roller bracket 935 rotate together as a single unit. Accordingly, the four rollers 931, 932, 933, and 934 or the reference plane member 991 can be selectively switched to be located at the image reading position.

When the recording medium P passes in a state illustrated in FIG. 7, the image reading unit 92 reads the image forming side of the recording medium P via the exposure glass 94 from the direction indicated by arrow 940. As the sheet conveying roller 97 rotates, the outer circumferential surface 931a of the roller 931 moves in the same direction as the moving direction of the recording medium P. Accordingly, the recording medium P is positively conveyed without being hindered. Since the sheet conveying roller 97 and the four rollers 931, 932, 933, and 934 share the same drive source, when compared with a configuration in which a different drive source dedicated to the four rollers 931, 932, 933, and 934 of the opposing member 93 is provided to the image reading device 9, the cost and space of components of the image reading device 9 can be reduced. Accordingly, the drive source that drives and rotates the four rollers 931, 932, 933, and 934 can be different from the drive source that drives and rotates the roller bracket 935 that selectively switch the four rollers 931, 932, 933, and 934 to be located to the image reading position.

The drive unit illustrated in FIG. 7 employs a drive source of the sheet conveying roller 97 disposed downstream from the image reading position in the sheet conveying direction so as to rotate the four rollers 931, 932, 933, and 934. However, the drive unit may drive and rotate the sheet conveying roller 96 disposed upstream from the image reading position in the sheet conveying direction simultaneously.

Figure 9:
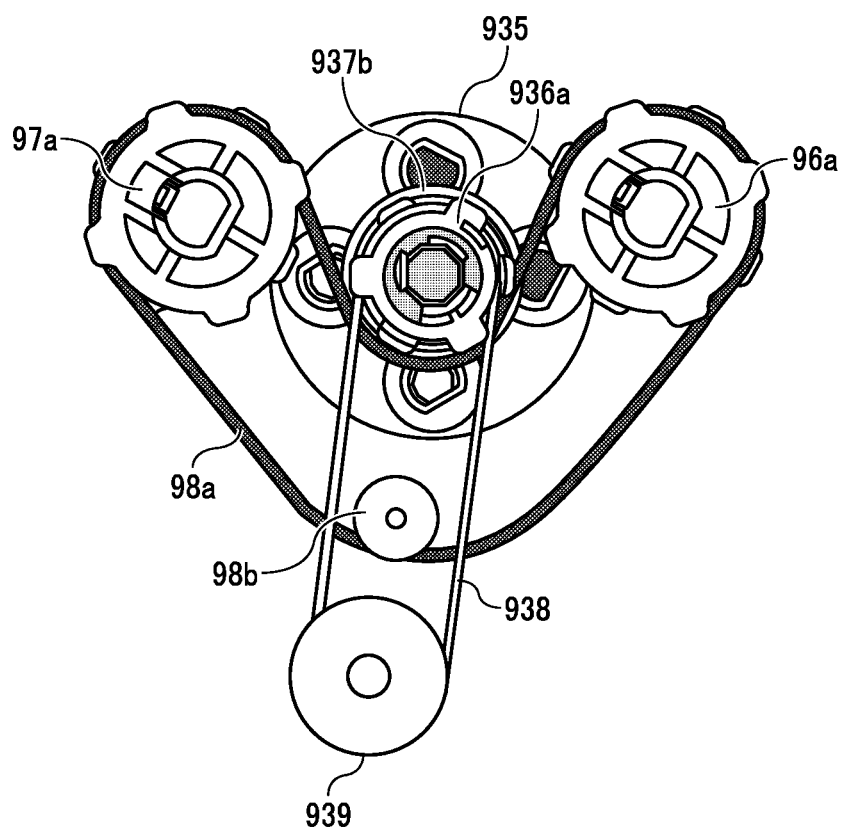
FIG. 9 is a side view illustrating the drive unit of the opposing member according to Embodiment 3.

FIG. 8 is a perspective view illustrating a drive unit of the opposing member 93 according to Embodiment 3. As illustrated in FIG. 8, the drive unit includes a drive source of the sheet conveying rollers 96 and 97 disposed upstream and downstream from the image reading position in the sheet conveying direction, respectively, so as to rotate the of the four rollers 931, 932, 933, and 934. FIG. 9 is a side view illustrating the drive unit of the opposing member 93 of FIG. 8, according to Embodiment 3.

In the drive unit of the opposing member 93 illustrated in FIG. 8, the roller drive pulley 937*b* is drivingly coupled with the sheet conveying roller drive pulley 96*a* of the sheet conveying roller 96 disposed upstream from the image reading position in the sheet conveying direction, the sheet conveying roller drive pulley 97*a* of the sheet conveying roller 97 disposed downstream from the image reading position in the sheet conveying direction, and the drive belt 98*a*. The drive belt 98*a* is driven by the drive pulley 98*b* that is connected to the drive source. As the drive pulley 98*b* is rotated by the drive source, the sheet conveying roller drive pulleys 96*a* and 97*a* and the roller drive pulley 937*b* rotate simultaneously via the drive belt 98*a*. According to this configuration, when the sheet conveying rollers 96 and 97 are rotated, the four rollers 931, 932, 933, and 934 are rotated via the roller drive gear 937*a* and the roller gears 931*b*, 932*b*, 933*b*, and 934*b* at the same time. At this time, the roller 931 that is disposed facing the exposure glass 94 moves in the same direction as the moving direction of the recording medium P. As the drive source such as a drive motor drives and rotates the roller bracket drive pulley 939, the roller bracket 935 is rotated, so that the four rollers 931, 932, 933, and 934 or the reference plane member 991 are selectively switched to be located at the image reading position.

Accordingly, by driving the sheet conveying roller 96 disposed upstream from the image reading position in the sheet conveying direction of the recording medium P, the sheet conveying roller 97 disposed downstream from the image reading position in the sheet conveying direction of the recording medium P, and the roller 931 by the same single drive source, when compared with a configuration in which different drive sources are disposed to the sheet conveying rollers 96 and 97 and the roller 931, the cost and space of components of the image reading device 9 can be reduced.

The configurations according to the above-described embodiments are not limited thereto. This disclosure can achieve the following aspects effectively.

Aspect A.

An image reading device of Aspect A (for example, the image reading device 9) includes an image reader (for example, the image reading unit 92), a sheet conveyance passage (for example, the sheet conveyance passage R), a transparent body (for example, the exposure glass 94), an opposing body (for example, the opposing member 93), and multiple curved opposing portions (for example, the outer circumferential surfaces 931*a*, 932*a*, 933*a*, and 934*a*, and the reference plane members 991, 992, and 993). The image reader is configured to read an image formed on a target object (for example, the recording medium P). The sheet conveyance passage is a passage through which the target object is conveyed. The transparent body is disposed between the sheet conveyance passage and the image reader. The opposing member is disposed facing the transparent body on a side opposite the image reader. The multiple curved opposing portions have respective outwardly curving reference planes and are sequentially switched and located at a predetermined image reading position at which the multiple curved opposing portions face the transparent body with a gap through which the target object passes the predetermined image reading position.

According to this configuration, as described in Embodiment 1, the reference planes of the multiple curved opposing portions located at the image reading position that faces the transparent body with the predetermined gap are outwardly curved. Accordingly, different from a configuration in which a comparative opposing member having a prismatic shape including corners, the image reading device can avoid the target object from being caught in the sheet conveyance passage, and therefore a conveyance failure of the target object does not occur easily.

Further, the multiple curved opposing portions included in the opposing member can be selectively switched to come to the image reading position that faces the transparent member. Accordingly, the reference planes of the multiple curved opposing portions can act as reference planes having different functions in image reading. Accordingly, the image reading device of Aspect A can restrain the conveyance failure of the object having a reading target image thereon and can switch the reference planes having different functions from each other used as the reference planes when the image is read.

Aspect B.

In Aspect A, the opposing body (for example, the opposing member 93) includes multiple rotary bodies (for example, the four rollers 931, 932, 933, and 934) having respective outer circumferential surfaces (for example, the outer circumferential surfaces 931*a*, 932*a*, 933*a*, and 934*a*) as the multiple curved opposing portions. Further, the multiple rotary bodies are sequentially switched and located at the predetermined image reading position.

According to this configuration, as described in Embodiment 1, the rotary bodies sequentially located at the image reading position that faces the transparent body contact the target object (for example, the recording medium P) being conveyed, and rotate. Accordingly, the conveyance failure of the target object can be further restrained.

Aspect C.

In Aspect A, the opposing body (for example, the opposing member 93) includes rotary bodies (for example, the four rollers 931, 932, 933, 934) different from the multiple curved opposing portions (for example, the reference plane members 991, 992, and 993). Further, either one of the multiple curved opposing portions and the rotary bodies are sequentially switched and located at the predetermined image reading position.

According to this configuration, as described in Embodiment 2, while the image reading device is reading the image formed on the target object (for example, the recording medium P), the rotary bodies are located at the image reading position that faces the transparent body. As the rotary bodies contact the object being conveyed, the rotary body rotates. By so doing, the conveyance failure of the target object can be further restrained. Further, in the non-image reading operation in which the image forming device does not read the image formed on the target object, the multiple curved opposing portions having respective the reference planes are selectively switched and any one of the multiple curved opposing portions is located at the image reading position that faces the transparent body. By so doing, the selected one of the reference planes is read to function as a reference in the image reading operation.

Aspect D.

In Aspect A, the opposing body (for example, the opposing member 93) includes a guide (for example, the guide 994) having a planar face (for example, the flat face 994*a*) configured to guide conveyance of the object (for example, the recording medium P). Further, the guide is sequentially located at the predetermined image reading position at which the guide faces the transparent body with the gap through which the object passes.

According to this configuration, as described in Embodiment 2, when the target object is conveyed without reading the image formed on the target object, the guide is disposed facing the transparent body with a gap wider than the gap between the transparent body and the multiple curved opposing portions (for example, the outer circumferential surfaces 931*a*, 932*a*, 933*a*, and 934*a*, the reference plane members 991, 992, and 993) so that the target object can pass through the gap easily. By so doing, the flat face of the guide can guide the object. Accordingly, the conveying force applied to the target object is reduced, and, at the same time, the target object can be conveyed reliably.

Aspect E.

In any one of Aspect B through Aspect D, at least one of color of the reference planes of the multiple curved opposing portions (for example, the outer circumferential surfaces 931*a*, 932*a*, 933*a*, and 934*a*, the reference plane members 991, 992, and 993) and diameters of the multiple rotary bodies (for example, the four rollers 931, 932, 933, and 934) are different from each other.

According to this configuration, as described in Embodiment 1, by providing the different colors to the reference planes of the multiple curved opposing portions, the multiple reference planes having the colors different from each other to function as a reference in the image reading operation can be switched. Further, by providing the different diameters to the multiple rotary bodies, the multiple rotary bodies having the different diameters from each other can be switched such that the transparent body and each of the outer circumferential surfaces (that is, the curved opposing portions) of the rotary bodies can be disposed facing each other with the appropriate gap according to the thickness of the target object.

Aspect F.

In any one of Aspect B through Aspect E, the image reading device (for example, the image reading device 9) further includes a drive device (for example, the drive belt 938, the roller bracket drive pulley 939). The opposing body (for example, the opposing member 93) includes a rotary body holder (for example, the roller bracket 935) configured to hold the multiple rotary bodies (for example, the four rollers 931, 932, 933, and 934) spaced from each other from a center of rotation of the rotary body holder, and to rotate about the center of rotation together with the multiple rotary bodies. Further, the drive device is configured to drive the rotary body holder and cause the multiple rotary bodies to be sequentially located at the predetermined image reading position.

According to this configuration, as described in Embodiment 1, by rotating the rotary body holder by the drive unit, the multiple rotary bodies held by the rotary body holder can stop at the image reading position with high stopping accuracy to form the gap.

Aspect G.

In Aspect F, the image reading device (for example, the image reading device 9) further includes a controller (for example, the apparatus body controller 60) configured to control a driving and rotating position of the rotary body holder and cause the multiple rotary bodies to stop at the predetermined image reading position.

According to this configuration, as described in Embodiment 1, since the rotary body holder can be stopped at the optional driving and rotating position, formation of a gap between the transparent body (for example, the exposure glass 94) and the opposing body (for example, the opposing member 93) according to the thickness of the target object and a change of color of the reference plane to be read at the image reading device can be performed easily.

Aspect H.

In any one of Aspect B through Aspect G, the image reading device (for example, the image reading device 9) further includes a rotary body drive body (for example, the roller drive gear 937*a*, the roller drive pulley 937*b*) configured to rotate the multiple rotary bodies (for example, the four rollers 931, 932, 933, and 934).

According to this configuration, as described in Embodiment 1, the multiple rotary bodies are driven and rotated. Accordingly, the target object can be conveyed more smoothly. Further, even the width of the gap between the transparent body (for example, the exposure glass 94) and the image reading position is reduced, a conveyance failure such as a paper jam can be prevented.

Aspect I.

In Aspect H, the image reading device (for example, the image reading device 9) further includes a conveying body (for example, the sheet conveying rollers 96 and 97) configured to convey the target object. Further, a drive source of the conveying body is shared as a drive source of the rotary body driving body (for example, the roller drive gear 937*a* and the roller drive pulley 937*b*).

According to this configuration, as described in Embodiment 3, the drive source of the conveying body is shared as the drive source of the rotary body driving body. Therefore, when compared with a configuration in which a dedicated motor is provided as a drive source of the rotary body driving body, the cost of the components of the image reading device can be reduced. Further, according to this configuration, a space saving of the image reading device can be enhanced.

Aspect J.

In any one of Aspect A through Aspect I, the multiple curved opposing portions (for example, the reference plane members 991, 992, and 993) include at least one of a curved opposing portion (for example, the reference plane member 991) including a white reference plane, a curved opposing portion (for example, the reference plane member 991) including a black reference plane, a curved opposing portion (for example, the reference plane member 992) including a color patch image, and a curved opposing portion (for example, the reference plane member 993) including a line image having lines drawn at predetermined positions.

According to this configuration, as described in the above-described embodiments, by reading the white reference plane and the black reference plane, the shading correction in the image reading operation can be performed. Further, by reading the color patch image formed on the curved opposing portion, the correction of a color image in the image reading operation can be performed. Further, by reading the line image formed on the curved opposing portion, the position correction of the magnification and registration of the image in the image reading operation can be performed.

Aspect K.

An image forming apparatus (for example, the image forming apparatus 500) includes an image forming device (for example, the process unit 1), a transfer device (for example, the transfer device 7), a fixing device (for example, the fixing device 8), and an image reading device (for example, the image reading device 9) of Aspect A. The image forming device is configured to form an image. The transfer device is configured to transfer the image onto the target object (for example, the recording medium P). The fixing device is configured to fix the image formed on the target object to the target object.

According to this configuration, as described in Embodiment 1, the image formed by the image forming device is corrected based on a result of image reading of the image formed on the target object read by the image reading device. Accordingly, image formation having a higher image quality can be performed.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image reading device comprising:
   an image reader configured to read an image formed on a target object conveyed along a sheet conveyance passage;
   a transparent body between the sheet conveyance passage and the image reader; and
   an opposing body facing the transparent body on a side opposite the image reader, the opposing body including multiple curved opposing portions, the multiple curved opposing portions including (i) an outer circumferential surface of each of multiple rotary bodies and (ii) respective outwardly curving reference planes, the opposing body configured to rotate to sequentially switch which of the multiple curved opposing portions are located at a image reading position at which a respective one the multiple curved opposing portions face the transparent body with a gap through which the target object passes the image reading position.

2. The image reading device according to claim 1, wherein
   the opposing body further includes a guide having a planar face configured to guide conveyance of the target object, the opposing body configured to rotate such that the guide is selectively located at a position at which the guide faces the transparent body with the gap through which the target object passes.

3. The image reading device according to claim 1, wherein at least one of color of the reference planes and diameters of the multiple rotary bodies are different from each other.

4. The image reading device according to claim 1, wherein the opposing body includes a rotary body holder configured to hold the multiple rotary bodies spaced from each other from a center of rotation of the rotary body holder, and to rotate about the center of rotation together with the multiple rotary bodies, and the image reading device further comprises:
   a drive device configured to drive the rotary body holder and cause the multiple rotary bodies to be sequentially located at the image reading position.

5. The image reading device according to claim 4, further comprising:
   a controller configured to control a driving and rotating position of the rotary body holder and cause a respective one of the multiple rotary bodies to stop at the image reading position.

6. The image reading device according to claim 1, further comprising:
   a rotary body driving body configured to rotate the multiple rotary bodies.

7. The image reading device according to claim 6, further comprising:
   a conveying body configured to convey the target object, wherein
   a drive source of the conveying body is shared as a drive source of the rotary body driving body.

8. The image reading device according to claim 1, wherein either one of the multiple curved opposing portions and the rotary bodies are sequentially switched and located at the image reading position.

9. The image reading device according to claim 1, wherein the outwardly curving reference planes include at least one of:
   a curved opposing portion including a white reference plane;
   a curved opposing portion including a black reference plane;
   a curved opposing portion including a color patch image; and
   a curved opposing portion including a line image having lines drawn at set positions.

10. An image forming apparatus comprising:
    an image forming device configured to form an image;
    a transfer device configured to transfer the image onto a target object;
    a fixing device configured to fix the image formed on the target object to the target object; and
    the image reading device according to claim 1.

11. An image reading device comprising:
    an image reader configured to read an image formed on a target object conveyed along a sheet conveyance passage;
    a transparent body between the sheet conveyance passage and the image reader; and
    an opposing body facing the transparent body on a side opposite the image reader, the opposing body including at least a plurality of rotary bodies having outer circumferential surfaces, the plurality of rotary bodies each being rotatable about separate axes, the opposing body configured to rotate to switch which of the plurality of rotary bodies are located at a image reading position at which a respective one the outer circumferential surfaces face the transparent body with a gap therebetween through which the target object passes the image reading position.

12. The image reading device of claim 11, wherein the outer circumferential surfaces of at least two of the plurality of rotary bodies have different diameters.

13. The image reading device of claim 11, wherein the opposing body further includes reference planes between the plurality of rotary bodies, the reference planes being curved such that, as the opposing body rotates, a point on a respective one of the reference planes located at the image reading position defines the gap between the respective one of the reference planes and the transparent body.

14. The image reading device of claim 13, wherein at least two of the reference planes are associated with different colors.

* * * * *